US011481447B2

(12) United States Patent
Okada et al.

(10) Patent No.: US 11,481,447 B2
(45) Date of Patent: Oct. 25, 2022

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventors: Shigeru Okada, Kanagawa (JP); Junichi Shimizu, Kanagawa (JP); Masanori Yoshizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 20 days.

(21) Appl. No.: 16/832,863

(22) Filed: Mar. 27, 2020

(65) Prior Publication Data
US 2021/0089590 A1    Mar. 25, 2021

(30) Foreign Application Priority Data
Sep. 20, 2019  (JP) .............................. JP2019-172119

(51) Int. Cl.
*G06F 16/00*     (2019.01)
*G06F 16/903*    (2019.01)

(52) U.S. Cl.
CPC .............................. *G06F 16/90335* (2019.01)

(58) Field of Classification Search
None
See application file for complete search history.

(56) References Cited

U.S. PATENT DOCUMENTS

| 2005/0144241 A1* | 6/2005 | Stata ....................... H04L 51/00 |
| | | 709/206 |
| 2006/0053154 A1* | 3/2006 | Yano ................. G06F 16/90324 |
| 2006/0101012 A1* | 5/2006 | Carson .................. G06F 16/951 |
| 2006/0123090 A1* | 6/2006 | Youngs ................ G06Q 10/107 |
| | | 709/206 |
| 2007/0171482 A1* | 7/2007 | Iwasaki .................... G06F 16/93 |
| | | 358/452 |
| 2010/0223671 A1* | 9/2010 | Tsuda ...................... G06F 16/93 |
| | | 726/26 |
| 2012/0254797 A1* | 10/2012 | Nagahama .......... G06F 16/3329 |
| | | 715/816 |
| 2015/0058321 A1* | 2/2015 | Tanaka .................. G06F 16/345 |
| | | 707/722 |
| 2015/0074085 A1* | 3/2015 | Bamford ........... G06F 16/24578 |
| | | 707/722 |
| 2016/0034915 A1* | 2/2016 | Soni ................... G06Q 30/0201 |
| | | 705/7.29 |

(Continued)

FOREIGN PATENT DOCUMENTS

JP   WO 1999014690 A1 *  3/1999
JP      2007272859 A  *  10/2007

(Continued)

*Primary Examiner* — Augustine K. Obisesan
(74) *Attorney, Agent, or Firm* — Oliff PLC

(57) ABSTRACT

An information processing device includes a processor programmed to: determine whether a character string indicating a reference to target information is recorded in a range within a document, the target information corresponding to a keyword in the document, the range being determined based on a position of the keyword in the document; and extract the target information upon a determination that the character string is recorded in the range.

20 Claims, 8 Drawing Sheets

(56) References Cited

U.S. PATENT DOCUMENTS

2016/0188702 A1* 6/2016 Lee-Goldman ..... G06F 16/3322
707/749
2018/0232573 A1 8/2018 Yamazaki
2018/0293215 A1* 10/2018 Jang ..................... G06F 40/279

FOREIGN PATENT DOCUMENTS

| JP | 2009110283 A | * | 5/2009 | |
|----|--------------|---|--------|---|
| JP | 2010140373 A | * | 6/2010 | |
| JP | 2010204910 A | * | 9/2010 | |
| JP | 4787955 B2 | * | 10/2011 | |
| JP | 2018-128996 A | | 8/2018 | |
| KR | 2011-0094563 A | * | 8/2011 | ............. G06F 17/30 |

* cited by examiner

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-172119 filed Sep. 20, 2019.

BACKGROUND

(i) Technical Field

The present disclosure relates to an information processing device and a non-transitory computer readable medium.

(ii) Related Art

Technology that uses key-value extraction technology to extract target information from a document has been disclosed. For example, Japanese Unexamined Patent Application Publication No. 2018-128996 describes a technology that specifies a region containing a keyword, and performs a character recognition process on the specified region to extract a value.

SUMMARY

With the key-value extraction technology of the related art, target information is extracted from nearby the keyword. However, as an example, in a document such as a contract or a complaint, a character string indicating a reference to the target information instead of the target information is recorded nearby a keyword, and the target information itself is recorded in the reference. In this case, because the target information does not exist near the keyword, extraction of the target information may be unsuccessful with the key-value extraction technology of the related art.

Aspects of non-limiting embodiments of the present disclosure relate to extracting target information corresponding to a keyword even in the case where the target information is not recorded in a range determined on the basis of the position of the keyword.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a processor programmed to: determine whether a character string indicating a reference to target information is recorded in a range within a document, the target information corresponding to a keyword in the document, the range being determined based on a position of the keyword in the document; and extract the target information upon a determination that the character string is recorded in the range.

BRIEF DESCRIPTION OF THE DRAWINGS

An exemplary embodiment of the present disclosure will be described in detail based on the following figures, wherein.

DETAILED DESCRIPTION

1. Configuration

Figure 1:
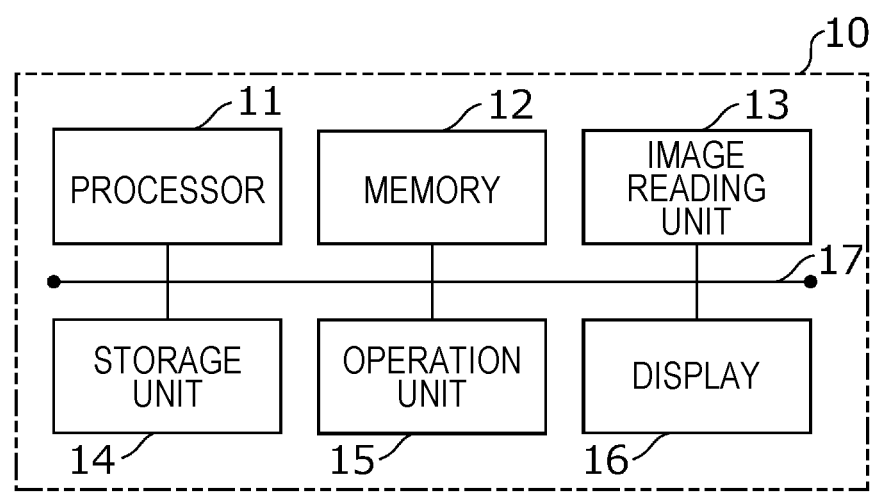
FIG. 1 is a diagram illustrating one example of a configuration of an image processing device.

FIG. 1 is a diagram illustrating one example of a configuration of an image processing device 10 (one example of an information processing device) according to an exemplary embodiment. The image processing device 10 includes a scan function, and reads a document. At this time, the image processing device 10 extracts target information on the basis of a keyword recorded in the document. The target information is also called a value, and is information desired by a user. The target information may include at least one of letters, numerals, symbols, and images. The images may be photographs, seal impressions, or figures. The keyword is a character string that serves as a sign of the target information. The keyword may include at least one of letters, numerals, and symbols. In other words, in the exemplary embodiment, the terms "keyword", "character string", and "characters" are used to refer to not only letters, but also numerals and symbols. The target information extracted from the document is used in various processes. For example, in the case where the target information is a deadline, the target information may be used for deadline management. In this case, to keep the user from going past the deadline, the user may be notified when the deadline approaches.

The image processing device 10 is provided with a processor 11, memory 12, an image reading unit 13, a storage unit 14, an operation unit 15, and a display 16. These hardware elements are connected through a bus 17. By executing a program, the processor 11 controls each unit of the image processing device 10 and performs a process of extracting target information from a document. For the processor 11, a central processing unit (CPU) may be used for example. The memory 12 stores the program executed by the processor 11. For the memory 12, read-only memory (ROM) and random access memory (RAM) may be used for example. The image reading unit 13 reads and converts a document into document data. For the image reading unit 13, an image scanner may be used for example. The storage unit 14 stores document data converted by the image reading unit 13. For the storage unit 14, a hard disk drive or a solid-state drive (SSD) may be used for example. The operation unit 15 supplies an operation signal corresponding to an operation by the user to the processor 11. For the operation unit 15, a touch panel and one or more buttons may be used for example. The display 16 displays a document according to document data. For the display 16, a liquid crystal display may be used for example.

Figure 2:
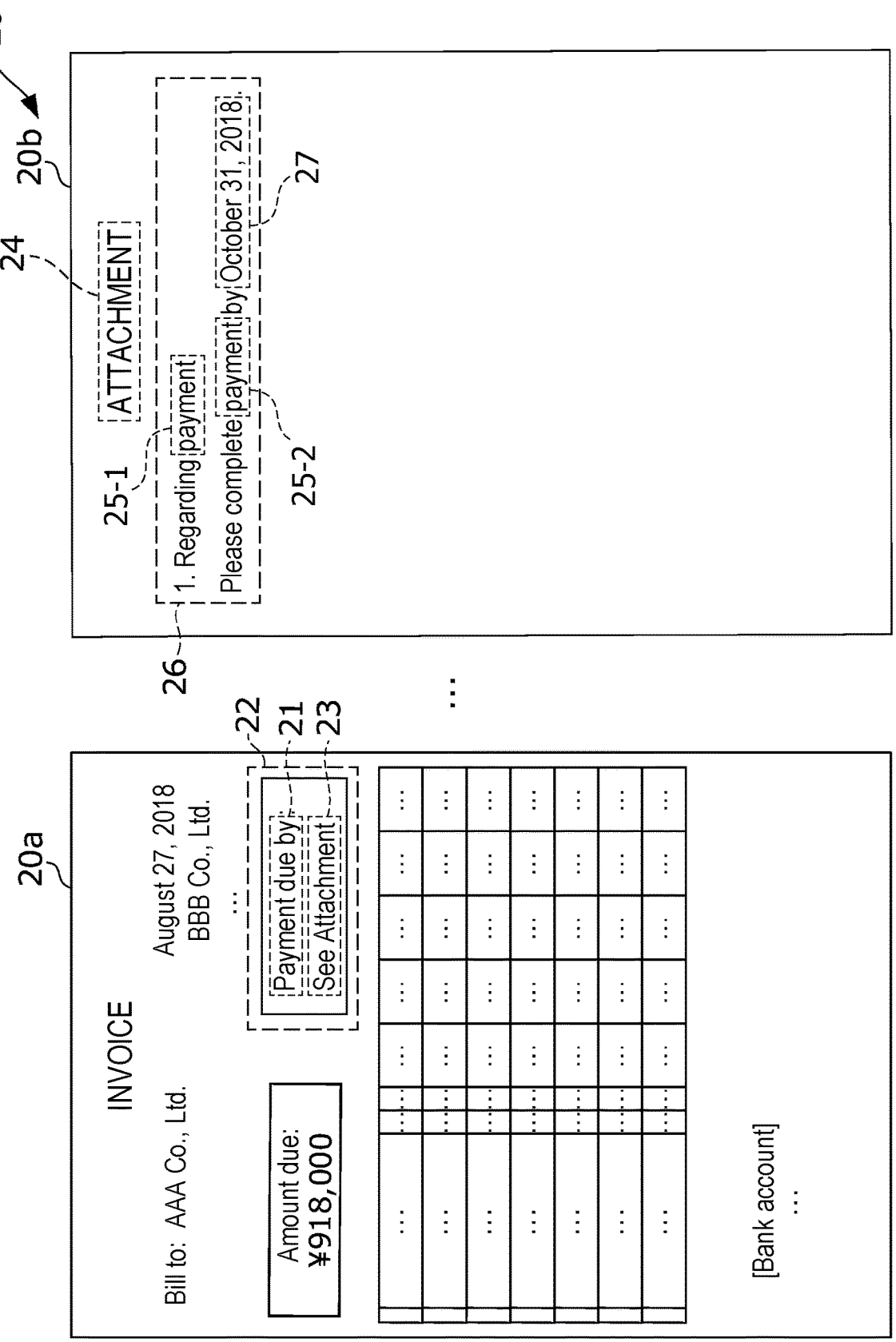
FIG. 2 is a diagram illustrating one example of a document.

FIG. 2 is a diagram illustrating one example of a document. A document 20 illustrated in FIG. 2 is an invoice with multiple pages. The document 20 includes a first page 20a, and a page 20b titled "ATTACHMENT". The description herein anticipates a case where the target information desired by the user is a date indicating a payment deadline.

On the page 20a, a keyword 21 (one example of a first keyword) stating "Payment due by" that serves as a sign of the target information is recorded. In a range (hereinafter referred to as the "nearby range") 22 determined on the basis of the position of the keyword 21, a character string (hereinafter referred to as the "referral character string") 23 stating "See Attachment" that indicates a reference to the payment deadline is recorded. The above indicates that the target information corresponding to the keyword 21 is recorded on the page 20b titled "ATTACHMENT". Note that although the referral character string 23 illustrated in FIG. 2 includes letters, the referral character string 23 is not limited to letters, and may include at least one of letters, numerals, and symbols. Herein, the conceivable direction and distance where the target information normally exists as seen from the position of the keyword 21 are predetermined for the keyword 21. The nearby range 22 is set to the range with a size less than or equal to a predetermined distance extending in a predetermined direction from the position of the keyword 21. For example, as illustrated in FIG. 2, the nearby range 22 may be a range extending up, down, left, and right from the position of the keyword 21. Note that the direction and the distance described above may also be different depending on the keyword.

In the upper part of the page 20b, a title 24 stating "ATTACHMENT" in a larger-than-standard font size is recorded. Also, on the page 20b, partial keywords 25-1 and 25-2 (one example of a second keyword) stating "payment" corresponding to the "Payment due by" keyword 21 are recorded. In a nearby range 26 of the partial keyword 25-1, a date 27 stating "Oct. 31, 2018" is recorded.

Figure 3:
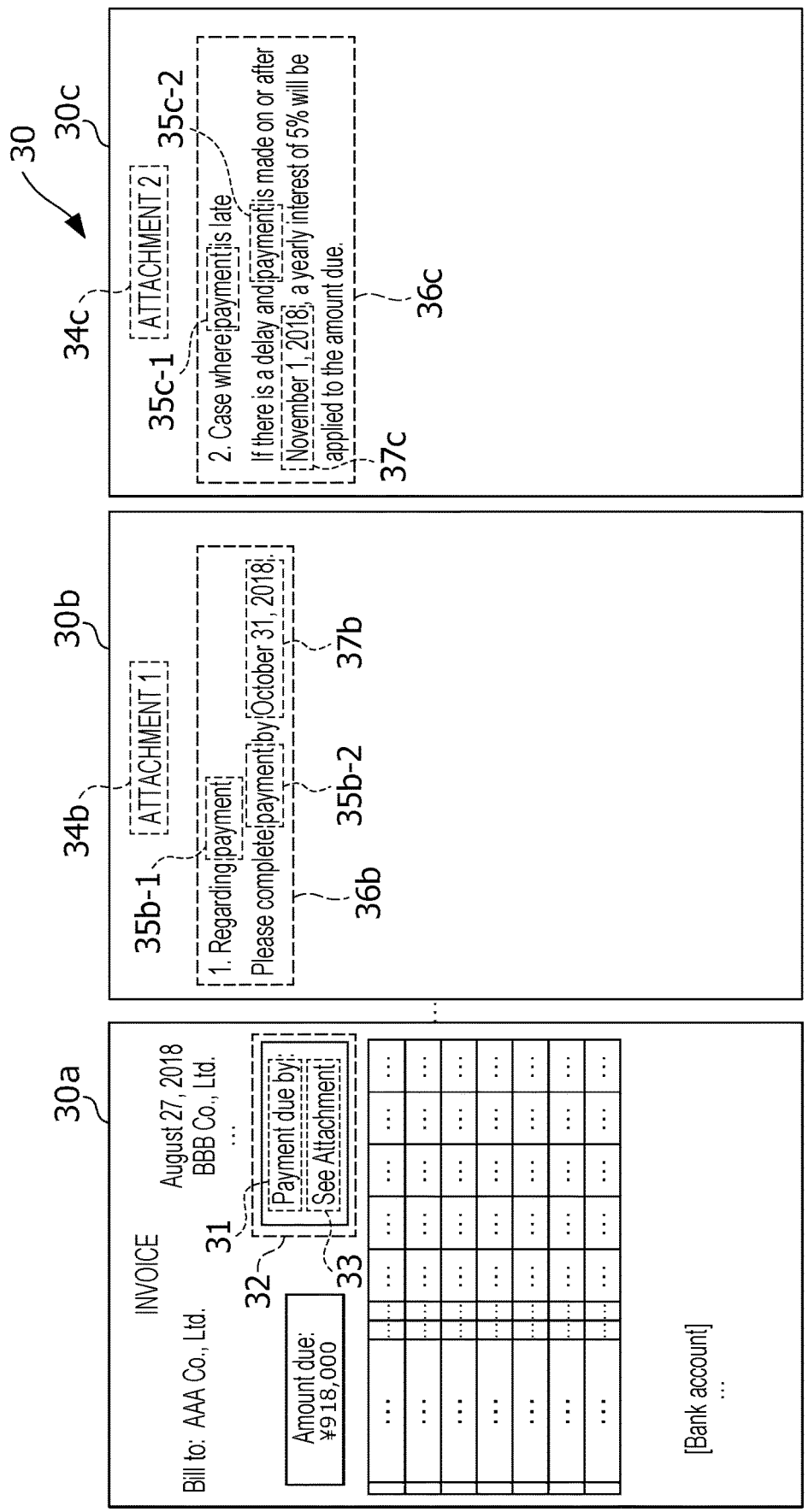
FIG. 3 is a diagram illustrating another example of a document.

FIG. 3 is a diagram illustrating another example of a document. A document 30 illustrated in FIG. 3 is an invoice with multiple pages. The document 30 includes a first page 30a, a page 30b titled "ATTACHMENT 1", and a page 30c titled "ATTACHMENT 2". Like the example illustrated in FIG. 2, the description herein anticipates a case where the target information desired by the user is a date indicating a payment deadline.

Similarly to the page 20a illustrated in FIG. 2, on the page 30a, a keyword 31 (one example of the first keyword) stating "Payment due by" is recorded. Also, similarly to the page 20a illustrated in FIG. 2, in a nearby range 32 of the keyword 31, a referral character string 33 stating "See Attachment" is recorded. The above indicates that the target information corresponding to the keyword 31 is recorded on the page 30b or 30c whose title includes "ATTACHMENT".

In the upper part of the page 30b, a title 34b stating "ATTACHMENT 1" in a larger-than-standard font size is recorded. Also, on the page 30b, partial keywords 35b-1 and 35b-2 (one example of the second keyword) stating "payment" corresponding to the "Payment due by" keyword 31 are recorded. In a nearby range 36b of the partial keyword 35b-1, a date 37b stating "Oct. 31, 2018" is recorded.

In the upper part of the page 30c, a title 34c stating "ATTACHMENT 2" in a larger-than-standard font size is recorded. Also, on the page 30c, partial keywords 35c-1 and 35c-2 stating "payment" corresponding to the "Payment due by" keyword 31 are recorded. In a nearby range 36c of the partial keyword 35c-1, a date 37c stating "Nov. 1, 2018" is recorded.

2. Operations

Figure 4:
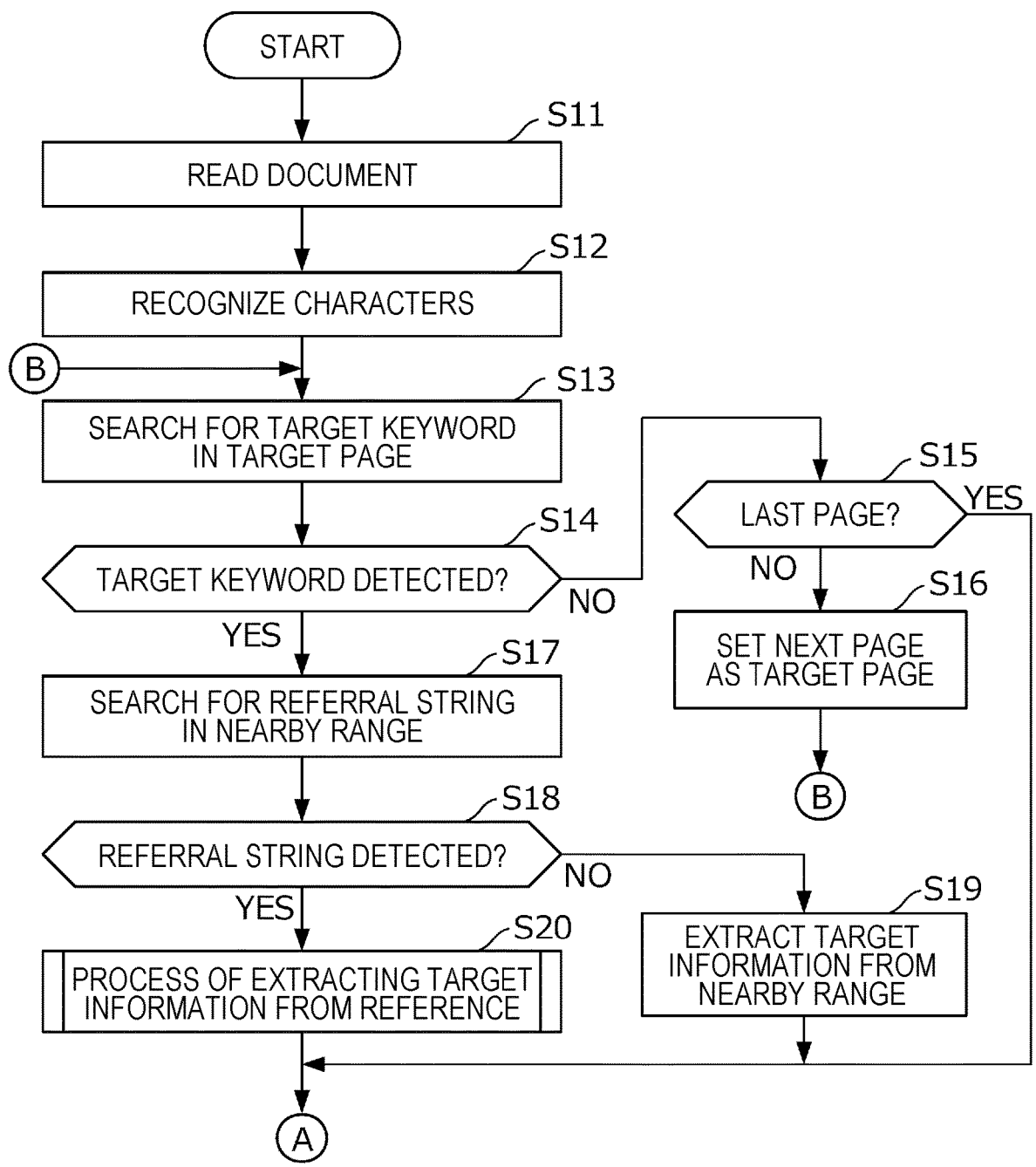
FIG. 4 is a flowchart illustrating one example of operations by the image processing device.
Figure 5:
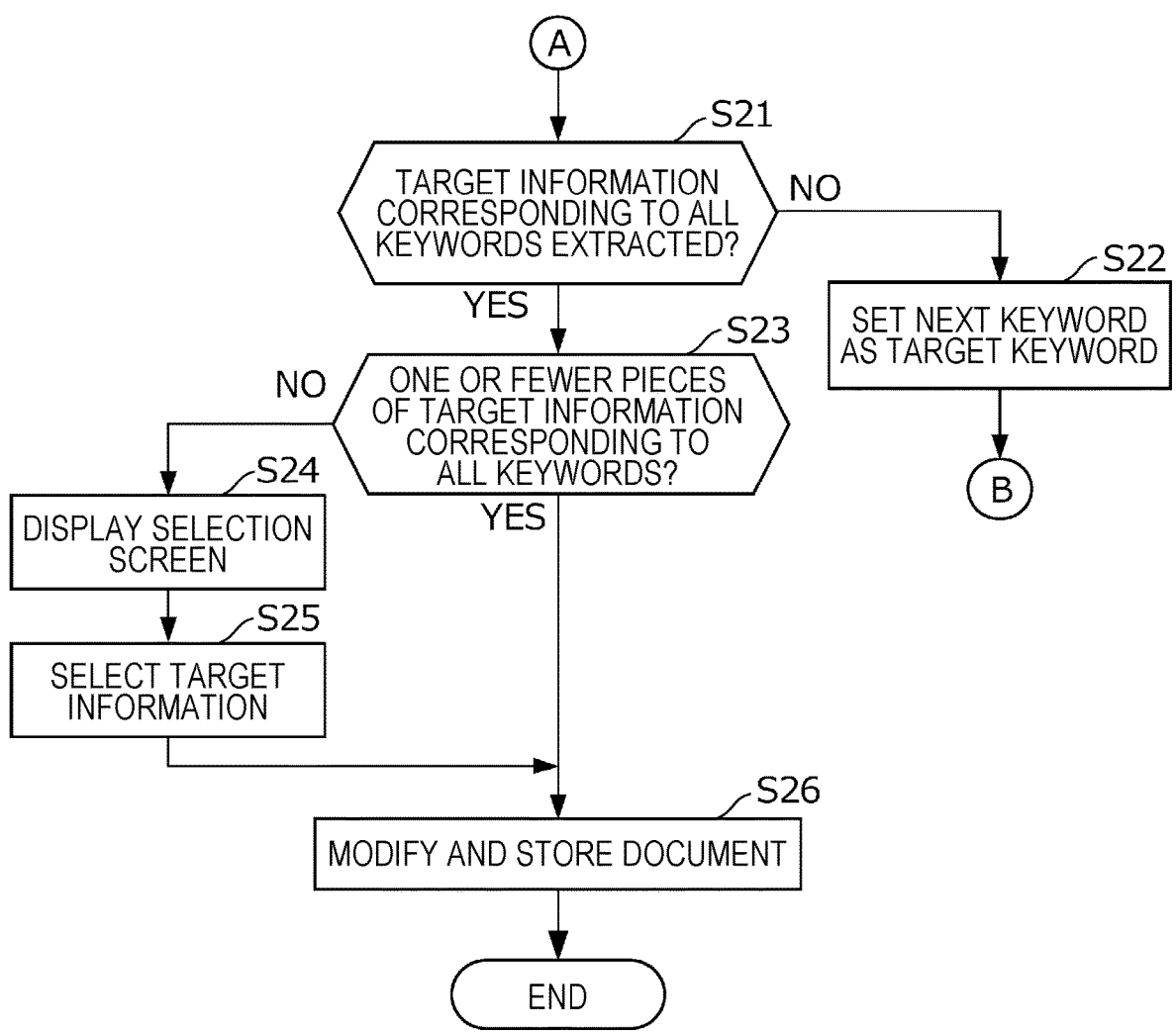
FIG. 5 is a flowchart illustrating one example of operations by the image processing device.

FIGS. 4 and 5 are flowcharts illustrating one example of operations by the image processing device 10. Note that in the following description, the processor 11 is described as the agent of the processes, but this means that the processes are performed by the processor 11 performing calculations or controlling the operations of other hardware elements through cooperation between the program stored in the memory 12 and the processor 11 executing the program.

Before the operations are performed, at least one keyword is set by the user. In the example illustrated in FIGS. 4 and 5, first, when a first keyword is detected by searching a document for the keyword in order from the first page, a process of extracting target information corresponding to the keyword is performed. When the target information corresponding to the first keyword is extracted, a similar process is performed for the next keyword. In this way, the process is repeated until target information is extracted for all keywords.

The process illustrated in FIG. 4 is started in response to, for example, the user setting a document in the image processing device 10 and using the operation unit 15 to perform an instruction operation to start reading the document. In step S11, the processor 11 causes the image reading unit 13 to read the document according to the instruction operation.

In step S12, characters recorded in the document read in step S11 are recognized. For the character recognition, optical character recognition (OCR) is used for example.

In step S13, the processor 11 searches a target page of the document for a target keyword. In the initial state, the target page is the first page, and the target keyword is the first keyword. At this point, the first keyword is assumed to be "payment due by". In this case, the first page is searched for the keyword "payment due by".

In step S14, it is determined whether or not the target keyword is detected as a result of the search in step S13. In the case where the target keyword is not detected (NO in the determination of step S14), the flow proceeds to step S15, and the processor 11 determines whether or not the target page is the last page. In the case where the target page is the last page (YES in the determination of step S15), the flow proceeds to step S21 illustrated in FIG. 5. On the other hand, in the case where the target page is not the last page (NO in the determination of step S15), the flow proceeds to step S16, and after the processor 11 sets the next page as the target page, the flow returns to step S13 described above. With this arrangement, the process from step S13 to S14 is repeated for the next page. On the other hand, in the case where the target keyword is detected (YES in the determination of step S14), the flow proceeds to step S17. Also, the target keyword detected in step S14 is stored in the memory 12.

In step S17, the processor 11 searches for a referral character string in the nearby range of the target keyword detected in step S14. At this point, the referral character string is assumed to be "See Attachment". In step S18, the processor 11 determines whether or not a referral character string is detected as a result of the search in step S17. In the case where the referral character string is not detected (NO in the determination of step S18), the flow proceeds to step S19, and the processor 11 extracts target information from the nearby range of the target keyword. The target information extracted in step S19 is stored in the memory 12.

Figure 6:
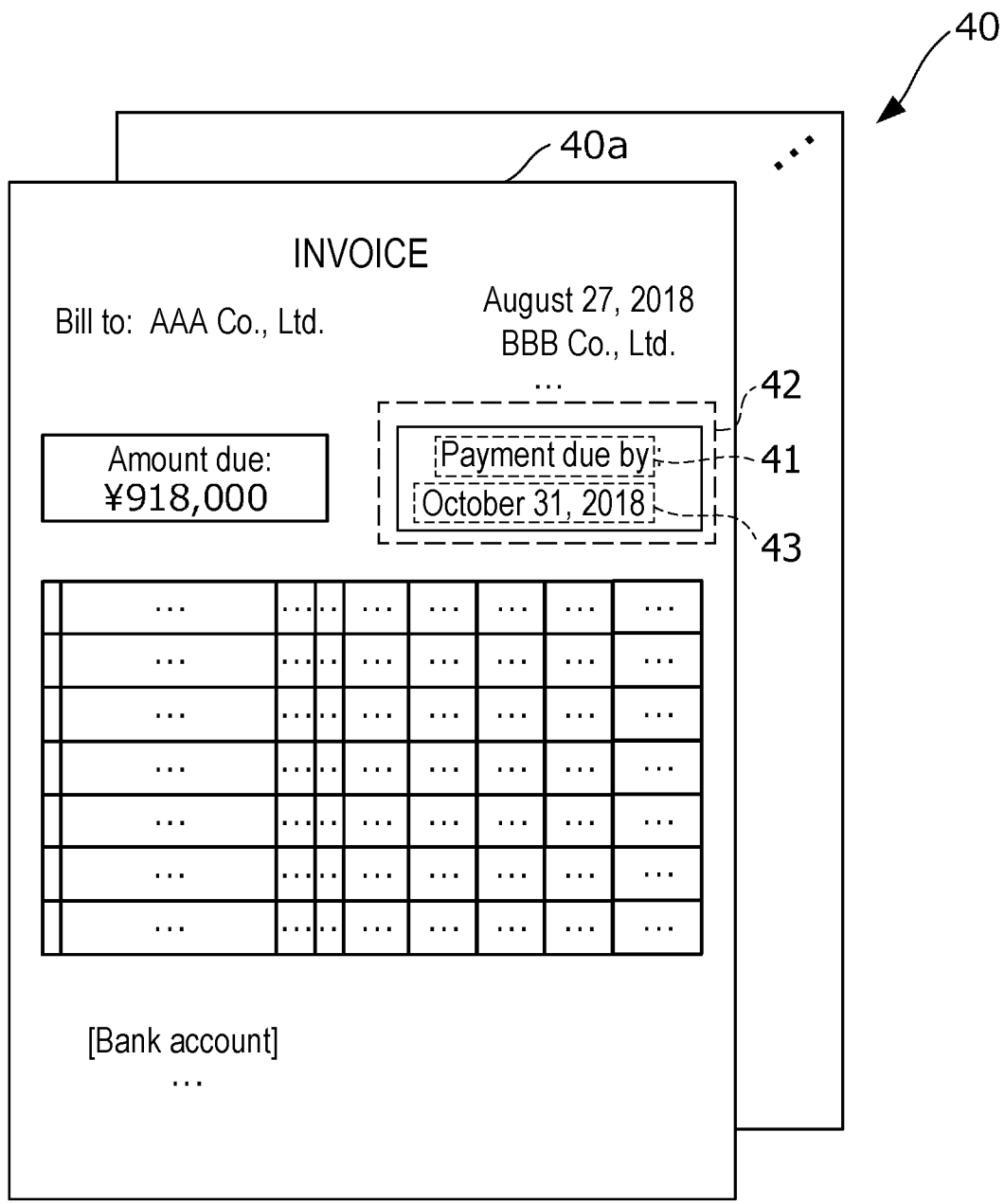
FIG. 6 is a diagram illustrating yet another example of a document.

FIG. 6 is a diagram illustrating yet another example of a document. A document 40 illustrated in FIG. 6 is an invoice with multiple pages. The document 40 includes a first page 40a. Because a keyword 41 stating "Payment due by" is recorded on the page 40a, the keyword 41 is detected in step S14 described above. Also, a date 43 stating "Oct. 31, 2018" is recorded inside a nearby range 42 of the keyword 41, but because the referral character string "See Attachment" is not recorded, the referral character string is not detected in step S18 described above. At this point, the format of the corresponding target information for the keyword stating "Payment due by" is predetermined to be a date format. In this case, in step S19 described above, the date 43 stating "Oct. 31, 2018" in a date format is extracted as the target information from the nearby range 42 of the keyword 41 recorded on the page 40a, and stored in the memory 12.

On the other hand, in step S18 described above, in the case where a referral character string is detected (YES in the determination of step S18), the flow proceeds to step S20, and the processor 11 performs a process of extracting target information corresponding to the target keyword from the reference indicated by the referral character string detected in step S18. In the example illustrated in FIG. 2, because the keyword 21 stating "Payment due by" is recorded on the first page 20a, the keyword 21 is detected in step S14 described above. Because the referral character string 23 stating "See Attachment" is recorded inside the nearby range 22 of the keyword 21, the referral character string 23 is detected in step S18 described above. In this case, in step S20 described above, the process of extracting the target information corresponding to the target keyword from the reference indicated by the referral character string 23 is performed.

Figure 7:
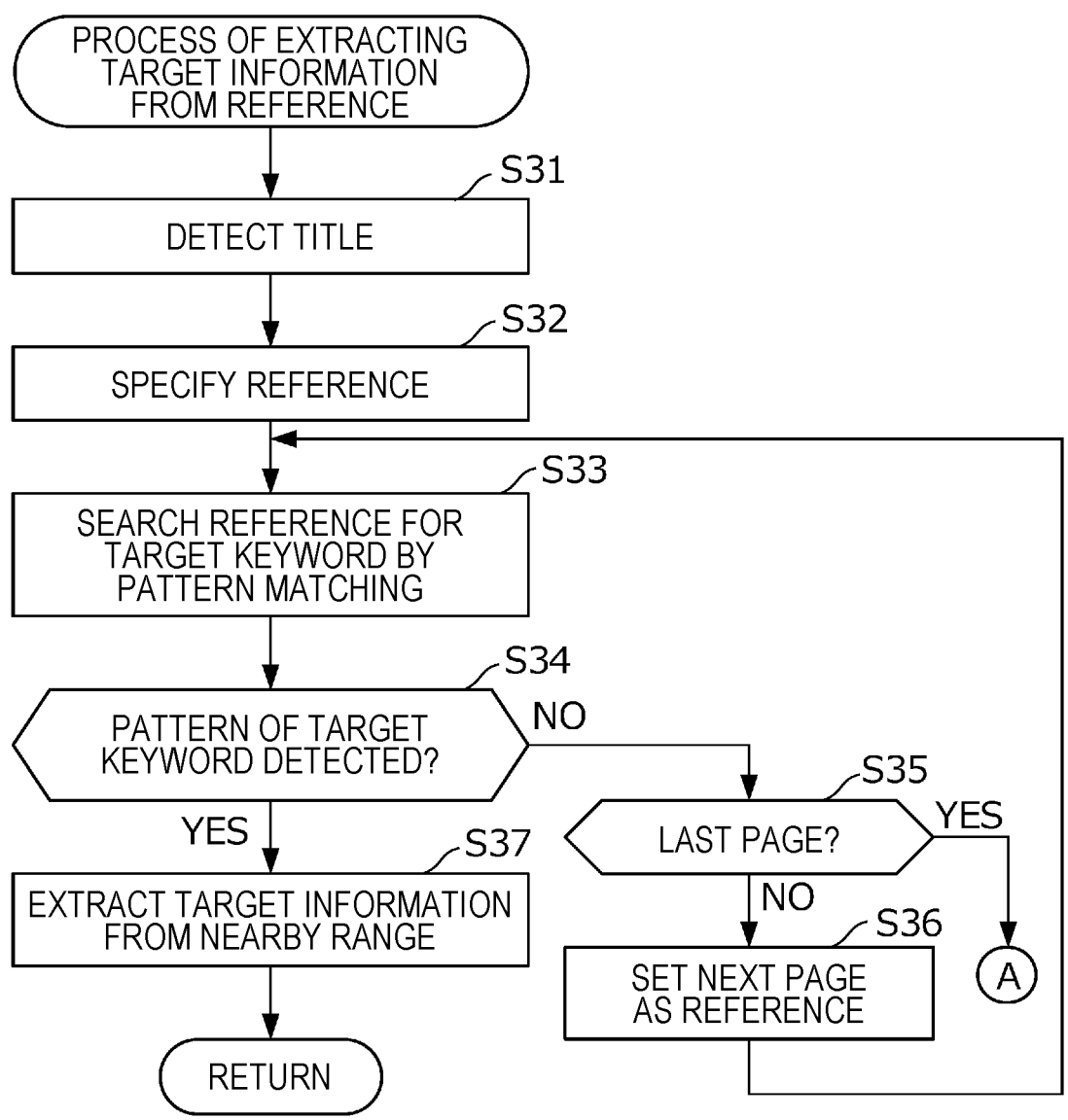
FIG. 7 is a flowchart illustrating one example of a process of extracting target information from a reference.

FIG. 7 is a flowchart illustrating one example of the process of extracting target information from a reference performed in step S20. In step S31, the processor 11 detects a title from each page of the document. Note that the title detection does not necessarily have to be performed for all pages. For example, the title detection may be performed on the page(s) after the target page, and does not have to be performed on the target page. The title detection is performed on the basis of conceivable positions where the title would be recorded on a page, and conceivable font sizes that would be used for the title, for example. In the document 20 illustrated in FIG. 2, the titles are recorded in a larger-than-standard font size in the upper part of each page. In this case, the character string in a larger-than-standard font size recorded in the upper part of each page is detected as the title. For the page 20b, the character string "ATTACH-MENT" is detected as the title 24. Titles are detected according to a similar method on other pages included in the document 20. Note that in the case where a title is not detected, a character string recorded on the first line of the page may also be used. Also, in the case where a title has already been detected in step S12 described above, step S31 may be skipped.

In step S32, the processor 11 specifies a reference according to the title detected in step S31. For example, the page having the title corresponding to the referral character string is specified as the reference. The title corresponding to the referral character string may also be a title containing a character string that is at least a part of the referral character string, or a title that resembles the referral character string. In the example illustrated in FIG. 2, the title 24 on the page 20b includes the character string "ATTACHMENT", which is part of the referral character string 23 stating "See Attachment". In this case, the page 20b having the title 24 is specified as the reference.

In step S33, the processor 11 uses pattern matching to search for the target keyword in the reference specified in step S32. With pattern matching, a partial keyword expressed as a regular expression of the target keyword is used, for example. This is because the keyword may not be recorded in exactly the same way in the reference, and there is a possibility that the keyword is recorded as a different expression. In the example illustrated in FIG. 2, a partial keyword such as "payment" or "due" expressed as a regular expression of the keyword 21 stating "Payment due by" is used. In this case, the process moves to the page 20b of the reference, and a search for the partial keyword is performed.

In step S34, the processor 11 determines whether or not a pattern of the target keyword is detected. In the case where a pattern of the target keyword is not detected (NO in the determination of step S34), the flow proceeds to step S35, and the processor 11 determines whether or not the reference is the last page. In the case where the reference is the last page (YES in the determination of step S35), the flow proceeds to step S21 illustrated in FIG. 5. On the other hand, in the case where the reference is not the last page (NO in the determination of step S35), the flow proceeds to step S36, and after the processor 11 sets the next page as the reference, the flow returns to step S33 described above. With this arrangement, the process from step S33 to S34 is repeated for the next page. On the other hand, in step S34 described above, in the case where a pattern of the target keyword is detected (YES in the determination of step S34), the flow proceeds to step S37. In the example illustrated in FIG. 2, because the partial keywords 25-1 and 25-2 stating "payment" are recorded on the page 20b, these partial keywords 25-1 and 25-2 are detected. Subsequently, the flow proceeds to step S37.

In step S37, the processor 11 extracts target information from the nearby range of the partial keyword detected in step S34. The target information extracted in step S37 is stored in the memory 12. At this point, as described above, the format of the corresponding target information for the keyword stating "Payment due by" is predetermined to be a date format. In this case, in the example illustrated in FIG. 2, the date 27 stating "Oct. 31, 2018" in a date format is extracted as the target information from the nearby range 26 of the partial keyword 25-1 recorded on the page 20b, and stored in the memory 12.

When the process of extracting target information from the reference ends, the flow proceeds to step S21 illustrated in FIG. 5, and the processor 11 determines whether or not target information corresponding to all keywords has been extracted. In the case where target information corresponding to all keywords has not been extracted (NO in the determination of step S21), the flow proceeds to step S22, and after the processor 11 sets the next keyword as the target keyword, the flow returns to step S13 illustrated in FIG. 4. With this arrangement, the process from step S13 to S21 described above is repeated for the next keyword. On the other hand, in the case where target information corresponding to all keywords has been extracted (YES in the determination of step S21), the flow proceeds to step S23.

In step S23, the processor 11 determines whether or not there is one or fewer pieces of target information corresponding to all keywords. For example, in the case where one piece of target information is respectively extracted for all keywords (YES in the determination of step S23), the flow proceeds to step S26. On the other hand, in the case where multiple target information candidates are extracted for at least one keyword (NO in the determination of step S23), the flow proceeds to step S24.

In the example illustrated in FIG. 3, like the example illustrated in FIG. 2, the keyword 31 stating "Payment due by" recorded on the page 30a and the referral character string 33 stating "See Attachment" recorded in the nearby range 32 of the keyword 31 are detected. However, because the title 34b on the page 30b and the title 34c on the page 30c both include the character string "ATTACHMENT" which is part of the referral character string 33, the pages 30b and 30c are both specified as references. Additionally, for the page 30b, the partial keywords 35b-1 and 35b-2 stating "payment" recorded on the page 30b are detected, and furthermore, the date 37b stating "Oct. 31, 2018" is extracted from the nearby range 36b of the partial keyword 35b-1. For the page 30c, the partial keywords 35c-1 and 35c-2 stating "payment" recorded on the page 30c are detected, and furthermore, the date 37c stating "Nov. 1, 2018" is extracted from the nearby range 36c of the partial keyword 35c-1. In this way, in the case where multiple target information candidates are extracted with respect to a single keyword, the flow proceeds to step S24.

Figure 8:
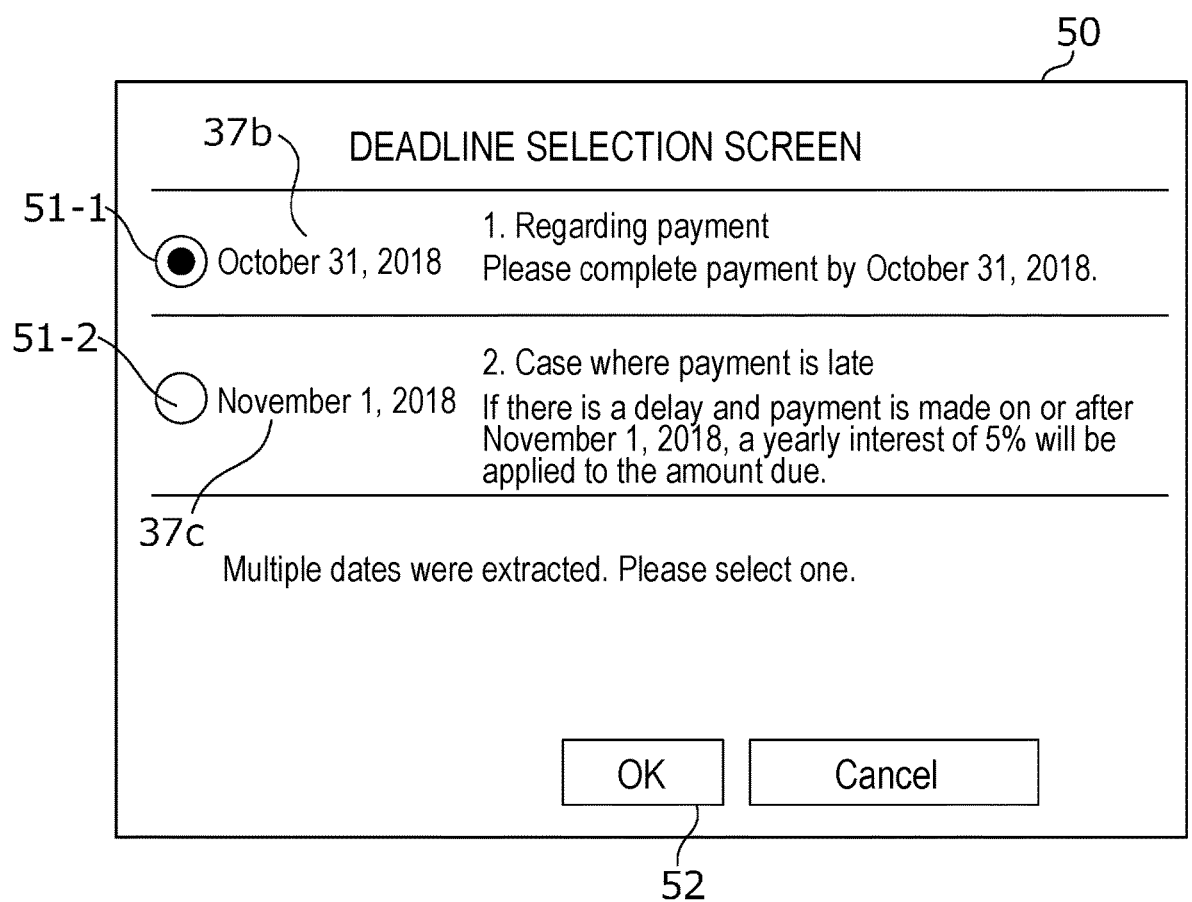
FIG. 8 is a diagram illustrating one example of a selection screen.

In step S24, the processor 11 causes the display 16 to display a selection screen that receives an operation of selecting one piece of target information from among the multiple target information candidates. FIG. 8 is a diagram illustrating one example of the selection screen. A selection screen 50 illustrated in FIG. 8 includes two target information candidates extracted with respect to the keyword 31 stating "Payment due by" illustrated in FIG. 3, namely the date 37b stating "Oct. 31, 2018" and the date 37c stating "Nov. 1, 2018", selection buttons 51-1 and 51-2 used to select these target information candidates, and an "OK" button 52 used to confirm the selection. For example, in the case of selecting the date 37b stating "Oct. 31, 2018", the user performs an operation of selecting the date 37b using the selection button 51-1, and then performs an operation of pressing the "OK" button 52. Note that in the case where multiple target information candidates are extracted with respect to multiple keywords, the selection screen may be configured to receive an operation of selecting one piece of target information from among multiple target information candidates for each of the multiple keywords.

In step S25, the processor 11 selects one piece of target information from among the multiple target information candidates in accordance with an operation by the user. For example, in the case where an operation of selecting the date 37b stating "Oct. 31, 2018" is performed as illustrated in FIG. 8, the date 37b is selected as the target information. In this case, the date 37b selected from among the multiple target information candidates is used as the target information, and the date 37c stating "Nov. 1, 2018" does not have to be used.

In step S26, the processor 11 changes the document such that the target information extracted in step S19 or S37 is displayed in association with the corresponding keyword, and causes the storage unit 14 to store the changed document. In the example illustrated in FIG. 2, a link to the page 20b is added to the referral character string 23 stating "See Attachment" recorded on the page 20a. For the link, a hyperlink may be used for example. Also, the display format of the document is changed such that the date 27 stating "Oct. 31, 2018" recorded on the page 20b is emphasized. For the emphasizing, highlighting may be used for example. In the case of viewing the document 20, the user causes the display 16 to display the document 20. At this time, if the user performs an operation of clicking on the link added to the referral character string 23, the page 20b is displayed according to the operation, thereby making it easy to view the date 27 stating "Oct. 31, 2018" that is the target information. Also, document data expressing the document is created and stored in the storage unit 14. At this time, attribute information including the pair of the keyword 21 stating "Payment due by" and the date 27 stating "Oct. 31, 2018" that is the target information stored in the memory 12 is added to the document data. For example, in the case where the file format of the document data is Portable Document Format (PDF), the pair of the target keyword and the target information may be included in the PDF attributes.

Also, in the case where the target information is selected in step S25, the document may be changed in step S26 such that the target information is displayed in association with the corresponding keyword, and the changed document may be stored in the storage unit 14. In the example illustrated in FIG. 3, only a link to the page 30b on which the date 37b selected as the target information is recorded may be added to the referral character string 33 stating "See Attachment" recorded on the page 30a. In other words, a link to the page 30c on which the date 37c not selected as target information is recorded does not have to be added. Additionally, the attribute information of the document data may also include only the pair of the keyword 31 stating "Payment due by" and the date 37b stating "Oct. 31, 2018" selected as the target information. In other words, the pair of the keyword 31 stating "Payment due by" and the date 37c stating "Nov. 1, 2018" not selected as the target information does not have to be included in the attribute information. After step S26, the process ends.

According to the exemplary embodiment described above, in the case where a referral character string is recorded in a nearby range of a keyword, target information corresponding to the keyword is extracted from a reference indicated by the referral character string, and therefore the target information corresponding to the keyword is extracted even in the case where the target information is not recorded in the nearby range of the keyword. For example, target information corresponding to the keyword is extracted even in the case where the keyword is recorded on one page and the target information is recorded on another page, as illustrated in FIGS. 2 and 3. Also, because the target information is extracted from the nearby range of a partial keyword recorded in the reference, the time taken to extract the target information is short compared to the case of searching the entire reference for the target information. Furthermore, because a link to the reference in which the target information is recorded is added to the referral character string, the user is able to perform an operation using the link and thereby view the target information in association with the keyword. Furthermore, even in the case where multiple target information candidates corresponding to the keyword are recorded in the reference, by having the user perform an operation of selecting target information from the multiple target information candidates, the piece of target information desired by the user is extracted. In this case, because the link to the reference in which the target information selected from among the multiple target information candidates is recorded is added to the referral character string, the user is able to perform an operation using the link and thereby view the selected target information in association with the keyword.

3. Exemplary modifications

The exemplary embodiment described above is one example of the present disclosure. The present disclosure is not limited to the exemplary embodiment described above. In addition, the exemplary embodiment described may also be modified like the following examples. At this time, two or more of the following exemplary modifications may also be combined and used.

(1) In the exemplary embodiment described above, the method of changing the document such that the target information is displayed in association with the keyword is not limited to the method that adds a link to the reference. For example, the processor 11 may also add the target information at a position displayed together with the keyword. The position displayed together with the keyword is a position displayed on the same screen as the keyword, for example. The position may also include a position adjacent to the keyword or the referral character string, for example. In the example illustrated in FIG. 2, the date 27 stating "Oct. 31, 2018" that is the target information may be recorded in the margin below the referral character string 23 stating "See Attachment" recorded on the page 20*a*. Alternatively, the date 27 stating "Oct. 31, 2018" that is the target information may be recorded instead of the referral character string 23 stating "See Attachment" on the page 20*a* illustrated in FIG. 2. According to the exemplary modification, it is possible to view the keyword and the target information together even in the case where the target information is not recorded in the nearby range of the keyword.

(2) In the exemplary embodiment described above, in the case where multiple target information candidates corresponding to the keyword are recorded in a reference as illustrated in FIG. 3, one of the multiple target information candidates may be selected without an operation by the user. In this case, the processor 11 decides a confidence of the multiple target information candidates. The confidence is a degree indicating likelihood. A higher confidence indicates a higher probability that a target information candidate is the target information corresponding to the keyword. The confidence may be decided on the basis of, for example, the location where the target information candidate appears, another character string near the target information candidate, a date indicated by the target information candidate, the font size of the target information candidate, or at least one combination of the above. Subsequently, the processor 11 selects one piece of target information from among the multiple target information candidates according to the confidence. For example, the piece of target information having the highest confidence among the multiple target information candidates may be selected.

In the case where the confidence is decided on the basis of the location where a target information candidate appears, the confidence may be raised for target information candidates appearing earlier in the order of appearance of the target information candidates. In this case, the piece of target information appearing first among the multiple target information candidates is selected.

In the case where the confidence is decided on the basis of another character string near a target information candidate, when a character string having a tendency of not being recorded together with the target information corresponding to a keyword is included within a predetermined distance from the target information candidate, the confidence of the target information candidate may be lowered. Conversely, when a character string having a tendency of being recorded together with the target information corresponding to a keyword is included within a predetermined distance from the target information candidate, the confidence of the target information candidate may be raised. This is because in the case where a character string having a tendency of not being recorded together with the target information corresponding to a keyword is included near a target information candidate, there is a high probability that the target information candidate is not the target information, and conversely, in the case where a character string having a tendency of being recorded together with the target information corresponding to a keyword is included near the target information candidate, there is a high probability that the target information candidate is the target information.

In the case where the confidence is decided on the basis of a date indicated by a target information candidate, the confidence may be raised for target information candidates indicating earlier dates. In this case, the target information indicating the earliest date from among the multiple target information candidates is selected. This is because in the case of performing deadline management using target information, for example, by using the target information indicating the earliest date from among the multiple pieces of target information, the user will be notified before the deadline passes, even in the hypothetical situation in which the selected target information is incorrect.

In the case where the confidence is decided on the basis of the font size of the target information candidate, the confidence may be lowered for target information candidates having a smaller font size. This is because in the case where a target information candidate has a small font size, there is a high probability that the target information candidate is part of a remark or a note for example and is not the target information.

According to the exemplary modification, because one piece of target information is selected from among the multiple target information candidates according to the confidence, a single piece of likely target information is extracted without an operation by the user, even in the case where multiple target information candidates corresponding to the keyword are recorded in a reference.

(3) In the exemplary embodiment described above, in the case where multiple pieces of target information are extracted from multiple references with respect to a single keyword as illustrated in FIG. 3, links to the references may be added to the corresponding referral characters. For example, the numerals "1" and "2" may be added after the referral character string 33 stating "See Attachment" recorded on the page 30*a*, a link to the page 30*b* may be added to the numeral "1", and a link to the page 30*c* may be added to the numeral "2". Also, the display format may be changed such that the date 37*b* stating "Oct. 31, 2018" recorded on the page 30*b* and the date 37*c* stating "Nov. 1, 2018" recorded on the page 30*c* are both emphasized. Furthermore, attribute information including the pair of the keyword 31 stating "Payment due by" and the date 37*b* stating "Oct. 31, 2018" as well as the pair of the keyword 31 stating "Payment due by" and the date 37*c* stating "Nov. 1, 2018" may both be added to the document data expressing the document 30. According to the exemplary modification, if the user causes the display 16 to display the document 30 and performs operations of clicking the links added to the numerals "1" and "2" after the referral character string 33, the pages 30*b* and 30*c* are displayed according to the operations, thereby making it easy to view the dates 37*b* and 37*c* which are target information candidates. With this configuration, after viewing the dates 37*b* and 37*c*, the user may perform an operation of selecting the desired target information from among the target information candidates.

(4) In the exemplary embodiment described above, the keyword and the target information do not necessarily have to be recorded on different pages. For example, location target information distant from the keyword may be recorded on a single page. In a document such as a contract, on a single page, a character string stating "See Section 5 of the contract" may be recorded in a nearby range of a keyword, and target information corresponding to the keyword may be recorded in Section 5 in a location outside the nearby range of the keyword in some cases. In this case, the character string stating "See Section 5 of the contract" acts as the referral character string, and target information is extracted from the reference referred to as "Section 5" indicated by the referral character string. In this way, the keyword and the target information may be recorded in different lines, paragraphs, or chapters on a single page.

(5) In the exemplary embodiment described above, pattern matching may also be used in the case of searching for the target keyword in step S13 or in the case of searching for the referral character string in step S17 illustrated in FIG. 4. For example, in the case of using pattern matching to search for the referral character string in the nearby range of the keyword, even if the character string recorded in the nearby range of the keyword is "See Attachment" or "stipulated in the attachment", the character strings are extracted as referral character strings.

(6) In the exemplary embodiment described above, the reference does not necessarily have to include a partial keyword. In this case, the entire reference may be searched for the target information.

(7) In the exemplary embodiment described above, the target information is not limited to a date indicating a payment deadline. The target information may be any kind of information that is recorded in a document. For example, in the case where the document is an invoice, the target information may be the date of the invoice, the name of the billing destination or the billing source, or the billed amount. In the case where the document is a contract, the target information may be the date of the contract, the name of a party to the contract, a date indicating a release period or a license period, a payment condition, or the content of a point of dispute. In this case, a character string that serves as a sign of the above target information is used as a keyword. Also, the purpose of the target information is not limited to deadline management. For example, in the case where the target information is the name of the billing destination, a process of storing the document data in a folder whose folder name includes the name may be performed. Also, a process of creating a file in which the pair of the keyword and the target information are recorded in a predetermined format and outputting the file to another system may be performed.

(8) In the embodiment above, the term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed. For example, the process of changing and storing the document in step S26 may be performed next after the process of extracting the target information in step S19 or S37. Also, the process of selecting the target information from step S23 to step S25 may be performed next after the process of extracting the target information in step S19 or S37.

(9) In the exemplary embodiment described above, the configuration of the image processing device 10 is not limited to the example illustrated in FIG. 1. The image processing device 10 may be provided with other hardware elements, and some of the hardware elements of the image processing device 10 may also be provided in another device. For example, at least one of the image reading unit 13, the storage unit 14, the operation unit 15, and the display 16 may be provided in another device. Also, the image processing device 10 may include a functional configuration that achieves a function of executing the processing in each step performed in the image processing device 10. For example, the image processing device 10 may be provided with a character recognition unit that recognizes characters, a detection unit that detects the keyword, a detection unit that detects the referral character string, an extraction unit that extracts the target information, a display control unit that causes the selection screen to be displayed, a selection unit that selects one piece of target information from among multiple target information candidates, a change unit that changes the document, an addition unit that adds the link, and an addition unit that adds the attribute information. Furthermore, an exemplary embodiment of the present disclosure may also be provided as a method including the steps of the processing performed in the image processing device 10.

(10) An exemplary embodiment of the present disclosure may also be provided as a program executed in the image processing device 10. The program may be downloaded through a communication channel such as the Internet, or may be provided by being recorded onto a computer readable recording medium such as a magnetic recording medium (such as magnetic tape or a magnetic disk), an optical recording medium (such as an optical disc), a magneto-optical recording medium, or semiconductor memory.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor programmed to:
search a document for a predetermined keyword;
search the document for a referral character string that is within a first predetermined physical range of the predetermined keyword;
search the document for a second instance of the referral character string, the searching of the document including at least searching of a second page different from a first page in which the keyword and the referral character string are first located, the second page being a subject of referral of the referral character string;
on the page that the second instance of the referral character string was found, determine whether, on the second page, an additional instance of the predetermined keyword is present;
upon locating the additional instance of the predetermined keyword on the second page, search a predetermined physical range of the additional predetermined keyword for target information; and
extract and display the target information onto a display screen.

2. The information processing device according to claim 1, wherein:
the predetermined keyword is a first keyword and the physical range is a first range; and
the processor is programmed to extract the target information indicated by the character string by:
detecting a second keyword corresponding to the first keyword by using pattern matching; and
extracting the target information from a second range determined on a basis of a position of the second keyword.

3. The information processing device according to claim 2, wherein the processor is programmed to:
detect a title of each of at least one page different from a page on which the predetermined keyword is recorded from among a plurality of pages included in the document; and
extract the target information from a title corresponding to the character string from among the detected titles.

4. The information processing device according to claim 2, wherein the processor is programmed to change the document such that the extracted target information is displayed in association with the predetermined keyword.

5. The information processing device according to claim 2, wherein the processor is programmed to:
determine whether a plurality of target information candidates corresponding to the predetermined keyword are recorded in a reference to the target information; and
upon a determination that the plurality of target information candidates corresponding to the predetermined keyword are recorded in the reference, extract the target information by extracting target information selected from among the plurality of target information candidates.

6. The information processing device according to claim 5, wherein
the plurality of target information candidates are recorded in a plurality of references indicated by the character string; and
the processor is programmed to add, to the character string, a link to the reference in which the selected target information is recorded from among the plurality of references.

7. The information processing device according to claim 1, wherein the predetermined physical range extends in a predetermined direction from a physical position of the keyword, the predetermined direction being one of up, down, left and right.

8. The information processing device according to claim 1, wherein the search the document for a second instance of the referral character string includes, at least searching of a second page different from a first page in which the keyword and the referral character string are first located, and of a third page different from the second page and the first page, the second page and the third page each being a subject of referral of the referral character string.

9. The information processing device according to claim 1, wherein the processor is programmed to:
detect a title of each of at least one page different from a page on which the predetermined keyword is recorded from among a plurality of pages included in the document; and
extract the target information from a title corresponding to the character string from among the detected titles.

10. The information processing device according to claim 9, wherein the processor is programmed to change the document such that the extracted target information is displayed in association with the predetermined keyword.

11. The information processing device according to claim 9, wherein the processor is programmed to:
determine whether a plurality of target information candidates corresponding to the predetermined keyword are recorded in a reference to the target information; and
upon a determination that the plurality of target information candidates corresponding to the predetermined keyword are recorded in the reference, extract the target information by extracting target information selected from among the plurality of target information candidates.

12. The information processing device according to claim 11, wherein
the plurality of target information candidates are recorded in a plurality of references indicated by the character string; and
the processor is programmed to add, to the character string, a link to the reference in which the selected target information is recorded from among the plurality of references.

13. The information processing device according to claim 1, wherein the processor is programmed to change the document such that the extracted target information is displayed in association with the predetermined keyword.

14. The information processing device according to claim 13, wherein the processor is programmed to add a link to a reference to the character string.

15. The information processing device according to claim 1, wherein the processor is programmed to:
determine whether a plurality of target information candidates corresponding to the predetermined keyword are recorded in the a reference to the target information; and
upon a determination that the plurality of target information candidates corresponding to the predetermined keyword are recorded in the reference, extract the target information by extracting target information selected from among the plurality of target information candidates.

16. The information processing device according to claim 15, wherein the processor is configured to:
cause the display to display a screen that allows a user to select the target information from among the plurality of target information candidates; and
extract the target information by:
receiving the selection of the target information; and
extracting the selected target information.

17. The information processing device according to claim 16, wherein
the plurality of target information candidates are recorded in a plurality of references indicated by the character string; and
the processor is programmed to add, to the character string, a link to the reference in which the selected target information is recorded from among the plurality of references.

18. The information processing device according to claim 15, wherein the processor is programmed to:
decide confidence levels of the plurality of target information candidates; and
extract the target information by selecting the target information from among the plurality of target information candidates according to the confidence levels.

19. The information processing device according to claim 15, wherein
the plurality of target information candidates are recorded in a plurality of references indicated by the character string; and
the processor is programmed to add, to the character string, a link to the reference in which the selected target information is recorded from among the plurality of references.

20. A non-transitory computer readable medium storing a program causing a computer to execute a process for processing information, the process comprising:
searching a document for a predetermined keyword;
searching the document for a referral character string that is within a first predetermined physical range of the predetermined keyword;
searching the document for a second instance of the referral character string, the searching of the document including at least searching of a second page different from a first page in which the keyword and the referral character string are first located, the second page being a subject of referral of the referral character string;
on the page that the second instance of the referral character string was found, determine whether, on the second page, an additional instance of the predetermined keyword is present;
upon locating the additional instance of the predetermined keyword on the second page, searching a predetermined physical range of the additional predetermined keyword for target information; and
extracting and displaying the target information onto a display.

* * * * *